US005684858A

United States Patent [19]

Hartmann et al.

[11] Patent Number: 5,684,858
[45] Date of Patent: Nov. 4, 1997

[54] DATA TRANSMISSION APPARATUS FOR USE WITH A SECURITY SYSTEM HAVING A TELEPHONE DIALER

[75] Inventors: Wade A. Hartmann, Middle Island; Herbert B. Krieger, Port Jefferson; Anthony E. Saunders, Sound Beach, all of N.Y.

[73] Assignee: CRN Telemetry Devices, Inc., Centereach, N.Y.

[21] Appl. No.: 520,272

[22] Filed: Aug. 28, 1995

[51] Int. Cl.⁶ .................................................. H04M 11/04
[52] U.S. Cl. .......................... 379/40; 379/355; 379/27; 379/33; 379/50
[58] Field of Search .......................... 379/32, 33, 26–28, 379/31, 37–44, 46–51, 59, 60, 221, 93, 354–357

[56] References Cited

U.S. PATENT DOCUMENTS

| | | |
|---|---|---|
| 3,914,692 | 10/1975 | Seaborn, Jr. . |
| 3,925,763 | 12/1975 | Wadhwani et al. . |
| 4,228,424 | 10/1980 | Le Nay et al. . |
| 4,465,904 | 8/1984 | Gottsegen et al. . |
| 4,521,645 | 6/1985 | Carroll . |
| 4,577,182 | 3/1986 | Millsap et al. . |
| 4,724,425 | 2/1988 | Gerhart et al. . |
| 4,868,859 | 9/1989 | Sheffer . |
| 4,887,290 | 12/1989 | Dop et al. . |
| 4,905,273 | 2/1990 | Gordon et al. ............................ 379/93 |
| 4,993,059 | 2/1991 | Smith et al. . |
| 5,027,383 | 6/1991 | Sheffer ....................... 379/39 |
| 5,131,019 | 7/1992 | Sheffer et al. ............... 379/39 |
| 5,134,644 | 7/1992 | Garton et al. . |
| 5,517,547 | 5/1996 | Ladha et al. .................. 379/39 |

*Primary Examiner*—Wing F. Chan
*Attorney, Agent, or Firm*—Galgano & Burke

[57] ABSTRACT

A data transmission apparatus includes a telephone line interface, a telephone line fault detector, DTMF and pulse dialing detectors, data pulse and tone detectors, a tone generator, a microprocessor controller, and a radio transmitter. The line fault detector monitors the phone line for a fault. The DTMF and pulse dialing detectors detect the telephone number dialed by the dialer. The microprocessor directs the radio transmitter to transmit a message indicting a telephone line failure if a line failure is detected. When a line failure is detected, the microprocessor causes the telephone line interface to disconnect the telephone dialer from the telephone line and to "capture" the dialer by coupling it to the data pulse and tone detectors and the tone generator. The data pulse and tone detectors and the tone generator emulate telephone line communication between the dialer and a monitoring station. The data received from the dialer is transmitted by the radio transmitter as an RF data burst. In addition, if the second programmed number in the dialer is one which can be recognized by the apparatus of the invention, the microprocessor will capture the dialer upon detection of the second programmed number having been dialed by the dialer. Communication with the dialer is then effected as described above.

16 Claims, 9 Drawing Sheets

DATA TRANSMISSION APPARATUS FOR USE WITH A SECURITY SYSTEM HAVING A TELEPHONE DIALER

BACKGROUND OF THE INVENTION

1. Field of the Invention

The invention relates to security systems. More particularly, the invention relates to security systems which communicate with a monitoring station via a telephone line.

2. State of the Art

Modern security systems (i.e. intrusion and or fire alarm systems) typically include a telephone dialer which is coupled to the alarm system and to a telephone line at the protected premises. Upon activation of the system (e.g., by intrusion or fire), the telephone dialer dials the telephone number of a central monitoring station and transmits information to the monitoring station so that police and or fire fighters may be dispatched to the protected premises.

The telephone dialer is typically a digital device with a modem. It is programmed to communicate with the central monitoring station according to a protocol which typically involves "handshaking". That is, the telephone dialer receives information from the central monitoring station prior to transmitting information to the monitoring station. Typically, the dialer waits for a "handshake" from the monitoring station before transmitting data and remains connected to the monitoring station until receipt of the data is acknowledged by the monitoring station. After the dialer and the monitoring station have satisfactorily exchanged messages, the security system is "kissed-off" by a message from the monitoring station. The exchange of messages between the monitoring station and the dialer usually takes approximately fifteen seconds. The dialer is also usually programmed with two telephone numbers so that a second telephone number can be called in the event that the first phone number fails.

It has been recognized that security system telephone dialers are limited by the integrity of the telephone line at the protected premises. Thus, the security system will fail if the telephone line fails. The failure of the telephone line may be an unpredictable natural event or may be the result of an intruder disabling the telephone line.

U.S. Pat. No. 4,887,290 to Dop et al., the complete disclosure of which is incorporated by reference herein, discloses a cellular telephone backup system for use with a standard security system having a telephone dialer. A line fault monitor is coupled to the telephone line at the protected premises and detects a failure of the telephone line. The line fault monitor is coupled via a latching relay to a pair of switching relays which are interposed between the telephone dialer and the telephone line. The switching relays are also coupled to a cellular telephone interface which is coupled to a cellular telephone transceiver. Upon failure of the telephone line, the latching relay latches the switching relays to remove the telephone line from the dialer and connect the cellular interface to the dialer. The dialer remains coupled to the cellular interface until the system is manually reset. This system has several drawbacks: cellular telephone service is not always available in every geographic location and cellular telephone service is relatively expensive.

A more recent solution to the problem is disclosed in U.S. Pat. No. 5,134,644 to Garton et al., the complete disclosure of which is incorporated by reference herein. The system proposed by Garton et al. is similar to the cellular system described above, but uses an RF transceiver instead of a cellular telephone transceiver. The RF transceiver system is coupled to an existing security system telephone dialer and is transparent to the existing telephone dialer. The user may select either the telephone line or the RF transceiver as the primary mode of communications and the system will condition the signals to and from the dialer as appropriate.

Both of the systems described above require a full or half duplex communications channel for communicating with the monitoring station. That is, both systems require the use of radio transceivers. It is well known that the availability of radio frequencies is limited by nature and is regulated by government agencies. Both of the systems described above require two radio frequencies for a duplex communications channel. Moreover, the duplex communications protocol used by these systems can be time consuming, and in responding to an intrusion or a fire, every second matters.

SUMMARY OF THE INVENTION

It is therefore an object of the invention to provide a data transmission apparatus for use with a security system telephone dialer which does not require a duplex communication channel.

It is also an object of the invention to provide a data transmission apparatus for use with a security system telephone dialer which can be retro-fitted to an existing security system.

It is another object of the invention to provide a data transmission apparatus for use with a security system telephone dialer which is automatically activated when the telephone line fails.

It is still another object of the invention to provide a data transmission apparatus for use with a security system telephone dialer which is automatically activated when a telephone connection cannot be made with a monitoring station even though the telephone line has not failed.

It is also an object of the invention to provide a data transmission apparatus for use with a security system telephone dialer which automatically transmits notification of a telephone line failure to a monitoring station.

It is another object of the invention to provide a data transmission apparatus for use with a security system telephone dialer which transmits a rapid burst of data so that the monitoring station is notified quickly of an intrusion or a fire.

It is still another object of the invention to provide a data transmission apparatus for use with a security system telephone dialer which transmits redundant messages to enhance the reliability of message reception.

It is also an object of the invention to provide a data transmission apparatus for use with a security system telephone dialer which can be programmed to send a different message to the monitoring station than the message which would have been sent by telephone line.

It is another object of the invention to provide a data transmission apparatus for use with a security system telephone dialer which also accepts input from other sensors and which can produce messages related to individual other sensors coupled to it.

In accord with these objects which will be discussed in detail below, the data transmission apparatus of the present invention includes a telephone line interface, a telephone line fault detector, DTMF and pulse dialing detectors, data pulse and tone detectors, a tone generator, a microprocessor controller, and a radio transmitter. The telephone line interface includes a DPDT relay switch which selectively uncouples an existing security system telephone dialer from the telephone line and to the data pulse and tone detectors and the tone generators of the invention. The telephone line fault detector is coupled to the telephone line and monitors either on-hook voltage or off-hook current or both. The DTMF and pulse dialing detectors are coupled to the telephone dialer and detect the telephone number dialed by the dialer. The microprocessor controller is coupled to the telephone line interface, the telephone line fault detector, the DTMF and pulse dialing detectors, the data pulse and tone detectors, the tone generator, and the radio transmitter.

The microprocessor receives signals from the telephone line fault detector and directs the radio transmitter to transmit a message indicating a telephone line failure if a line failure is so detected by the line fault detector. According to a presently preferred embodiment of the invention, a telephone line fault must exist for at least sixty seconds before a message is transmitted. In addition, when a telephone line failure is detected, the microprocessor causes the telephone line interface to disconnect the telephone dialer from the telephone line and to "capture" the dialer by coupling it to the data pulse and tone detectors and the tone generator. When the telephone dialer is captured, the data pulse and tone detectors and the tone generators are controlled by the microprocessor to emulate telephone line communication between the dialer and a monitoring station locally. The microprocessor stores the data received from the dialer, reorganizes it for radio transmission and activates the radio transmitter to transmit the data as an RF data burst.

In addition, the invention takes advantage of the second telephone number which can be programmed into most existing telephone dialers. When the telephone line has not failed, the DTMF and pulse dialing detectors monitor the output of the dialer to determine if a specified telephone number has been dialed (e.g. the second programmed telephone number). If the second programmed number in the dialer is one which can be recognized by the apparatus of the invention, the microprocessor will capture the dialer upon detection of the second programmed number having been dialed by the dialer. Communication with the dialer is then effected as described above.

Preferred aspects of the invention include: Providing up to eight additional inputs to the microprocessor for attaching other security sensors, providing a 48 volt telephone line simulation circuit for connection to the dialer when it is captured, and providing the microprocessor with additional intelligence to recognize other security sensors and to transmit different messages depending on the status of the system.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
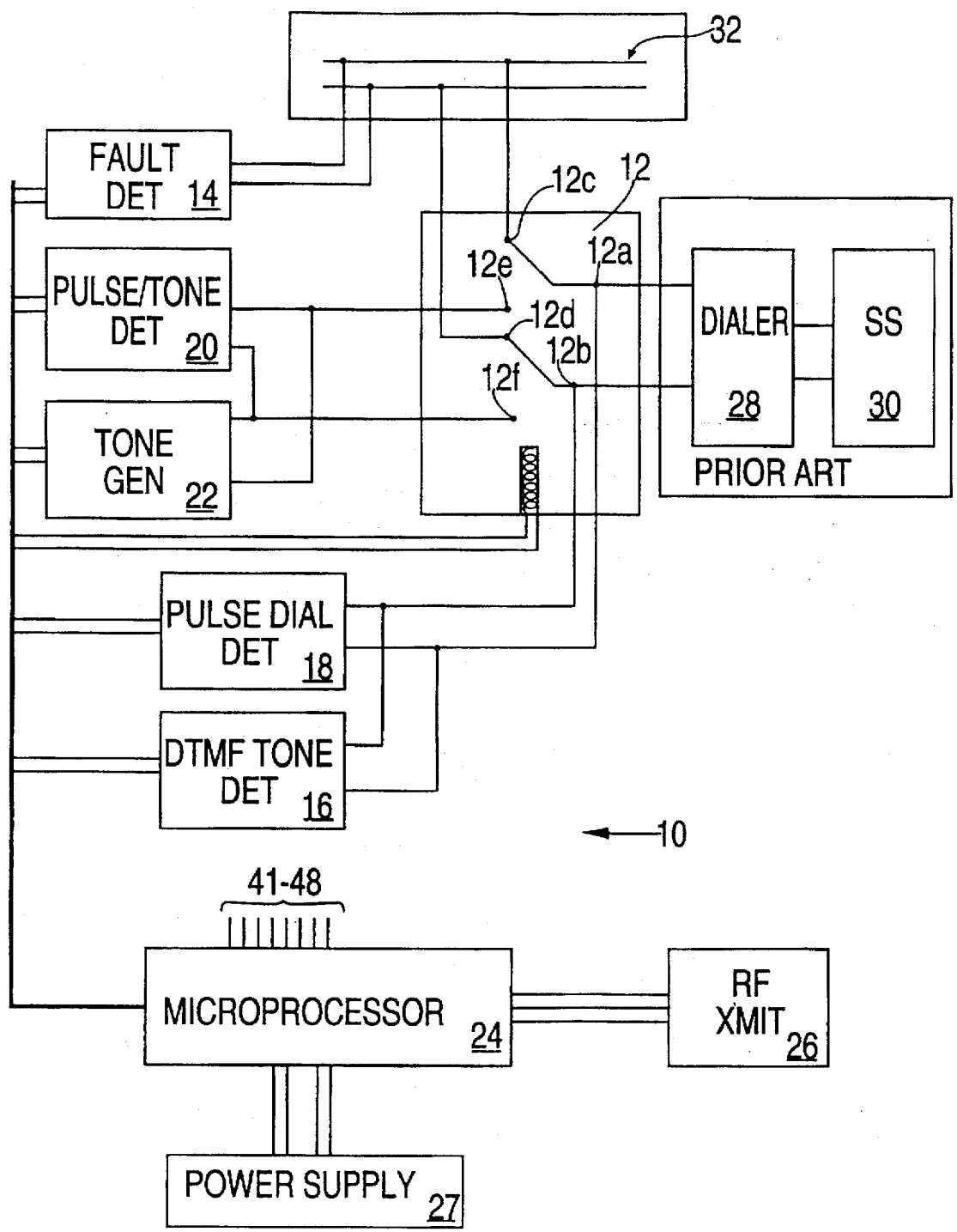
FIG. 1 is a simplified block diagram of an apparatus according to the invention coupled to the telephone dialer of a prior art security system.

Turning now to FIG. 1, the data transmission apparatus 10 of the present invention includes a telephone line interface 12, a telephone line fault detector 14, a DTMF (dual tone multifrequency) dialing detector 16, a pulse dialing detector 18, a data pulse and tone detector 20, a tone generator 22, a microprocessor controller 24, a radio transmitter 26, and a power supply 27. As shown in FIG. 1, the telephone line interface 12 is embodied as a DPDT relay switch having two poles 12a, 12b which are coupled to the telephone dialer 28 of an existing security system 30, a first pair of contacts 12c, 12d which are coupled to the telephone line 32, and a second pair of contacts 12e, 12f which are coupled to the data pulse and tone detector 20 and the tone generator 22. In the normal position shown in FIG. 1, the interface 12 couples the telephone dialer 28 to the telephone line 32. When activated, as described below, the interface 12 uncouples the dialer 28 from the phone line 32 and couples it to the data pulse and tone detector 20 and the tone generator 22. The DTMF dialing detector 16 and the pulse dialing detector 18 are connected to the poles 12a, 12b of the interface 12 so that they are always connected to the dialer 28.

The telephone line fault detector 14 is coupled to the telephone line 32 and monitors either on-hook voltage or off-hook current or both. The microprocessor controller 24 is coupled to the telephone line interface 12, the telephone line fault detector 14, the DTMF and pulse dialing detectors 16, 18, the data pulse and tone detector 20, the tone generator 22, the radio transmitter 26, and the power supply 27. In addition, the microprocessor controller 24 is preferably provided with up to eight additional inputs 41–48 for coupling it to other sensors such as closure contacts, motion detectors, smoke and fire sensors, etc. [not shown].

According to a first mode of operation of the apparatus 10, the microprocessor 24 receives signals from the telephone line fault detector 14 and directs the radio transmitter 26 to transmit a message indicting a telephone line failure if a line failure is so detected by the line fault detector 14. According to a presently preferred embodiment of the invention, a telephone line fault must exist for at least sixty seconds before a message is transmitted. In addition, when a telephone line failure is detected, the microprocessor 24 causes the telephone line interface 12 to disconnect the telephone dialer 28 from the telephone line 32 and to "capture" the dialer 28 by coupling it to the data pulse and tone detector 20 and the tone generator 22. When the telephone dialer 28 is captured, the data pulse and tone detector and the tone generator are controlled by the microprocessor 24 to emulate telephone line communication between the dialer 28 and a monitoring station [not shown]. More particularly, data pulse and tone detector 20 will receive data from the dialer 28 and the tone generator 22 will transmit data to the dialer 28 thus completing the "total data transfer" of information from the dialer to the apparatus #10. The microprocessor 24 stores the data received from the dialer, reorganizes it for radio transmission and activates the radio transmitter 26 to transmit the data as an RF data burst.

According to a second mode of operation of the apparatus 10, the microprocessor 24 receives signals from the pulse dial detector 16 and the DTMF tone detector 18 to determine what telephone number the dialer 28 is dialing. The apparatus 10 is programmed to respond to any particular telephone number, e.g. 222-3333. By programming the existing dialer 28 to dial this telephone number as its second choice, the apparatus 10 will respond to the dialer 28 if the first telephone number in the dialer 28 fails for whatever reason. For example, the dialer 28 will dial the second number if the first telephone number is busy or if a clear connection cannot be made using the first number. This latter circumstance may occur if the telephone line is noisy even though it has not actually failed. The DTMF and pulse dialing detectors 16, 18 monitor the output of the dialer 28 to determine if the specified telephone has been dialed. If so, the microprocessor 24 will capture the dialer as described above. Although not shown in FIG. 1, it will be understood that according to the invention, a monitoring station [not shown] must be provided with an appropriate radio receiver and accompanying processing apparatus to receive the transmitted signal from the apparatus 10 and identify the message sent.

Figure 2:
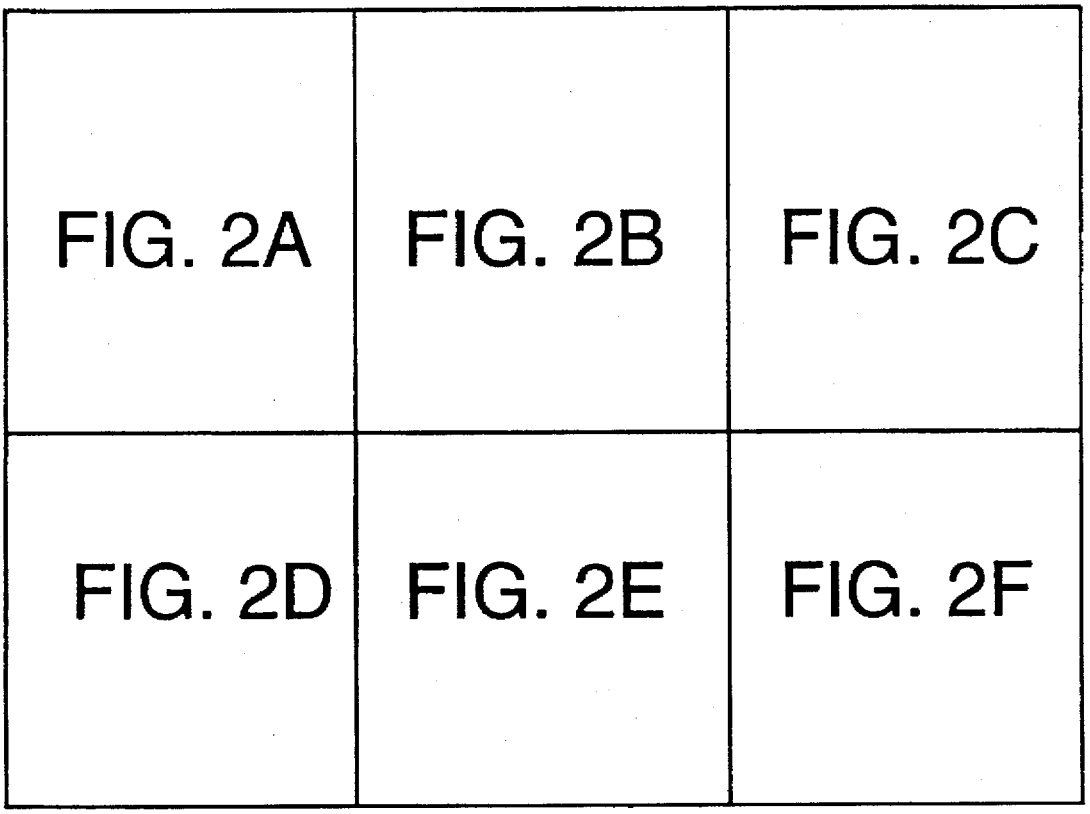
FIGS. 2, 2A–2F are detailed schematic diagram of a presently preferred embodiment of the invention.
Figure 2A:
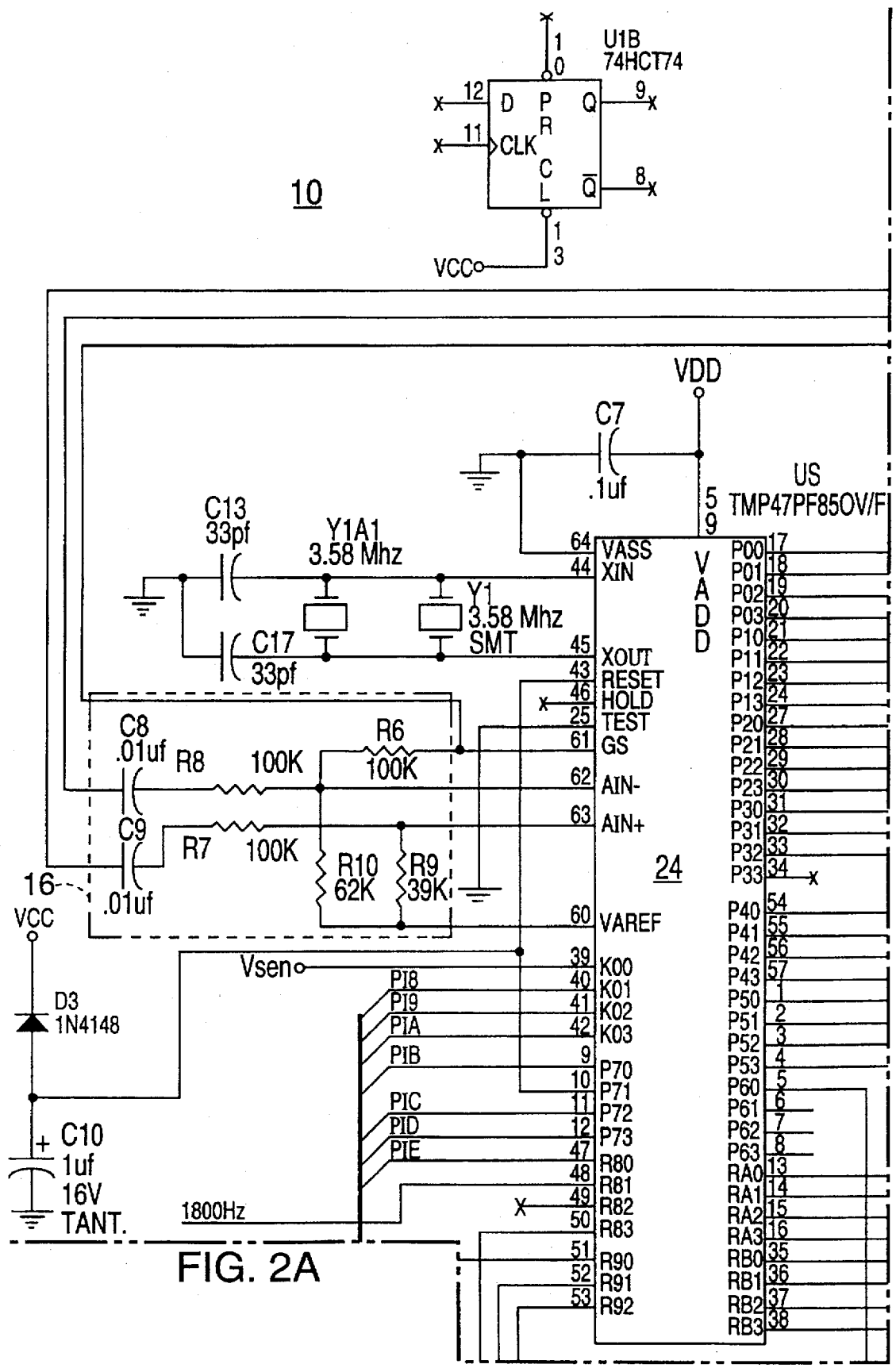
Figure 2B:
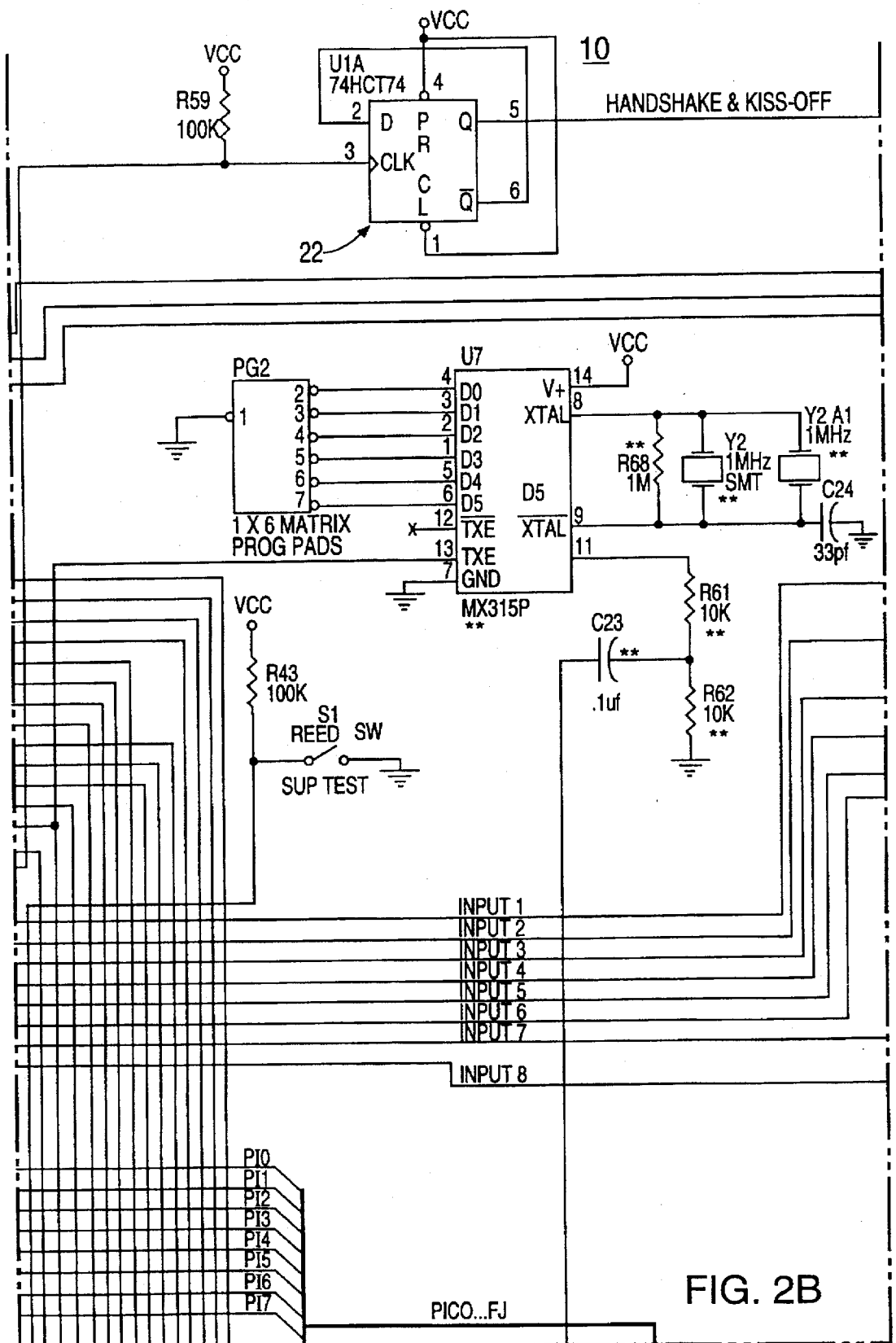
Figure 2C:
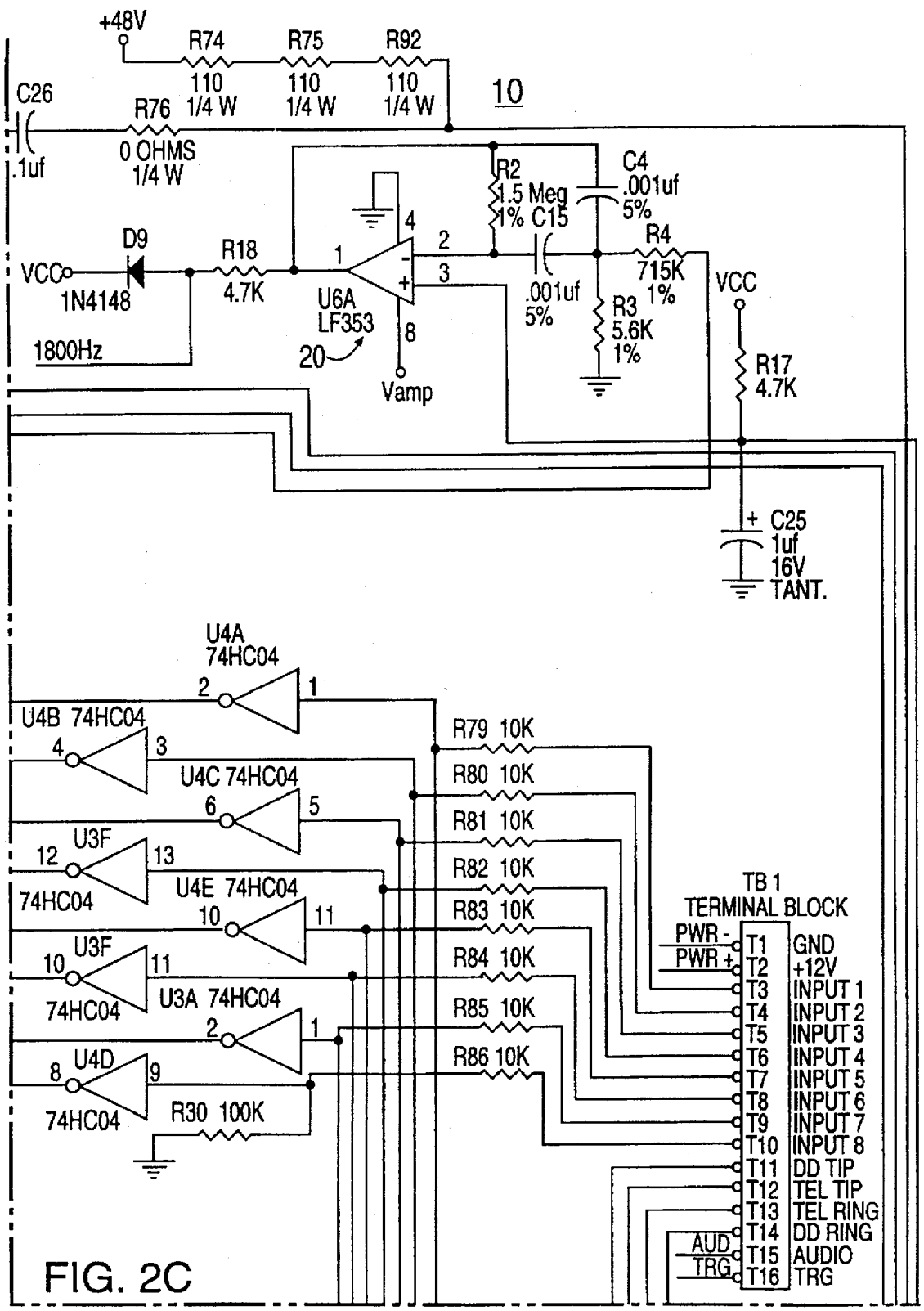
Figure 2D:
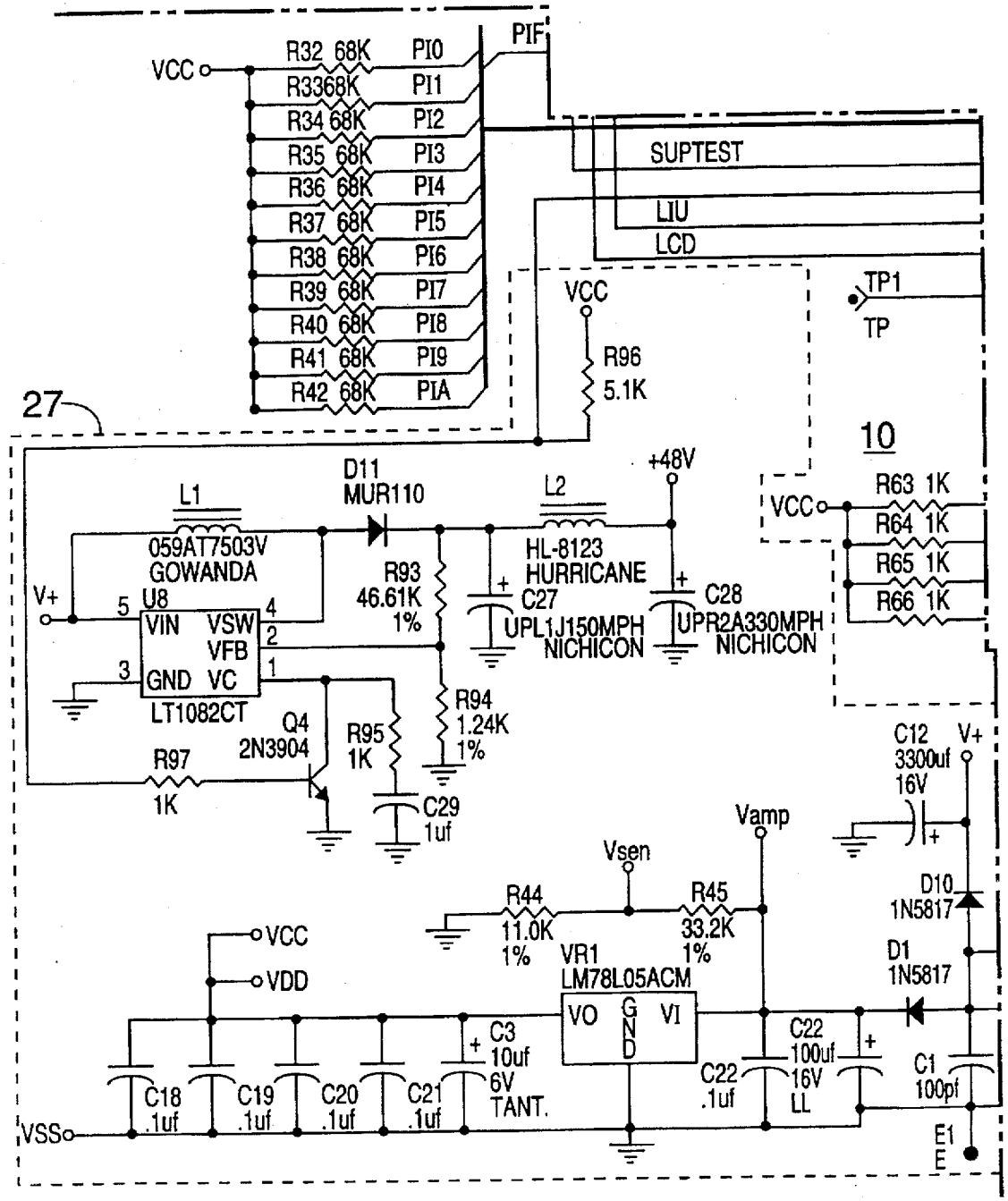
Figure 2E:
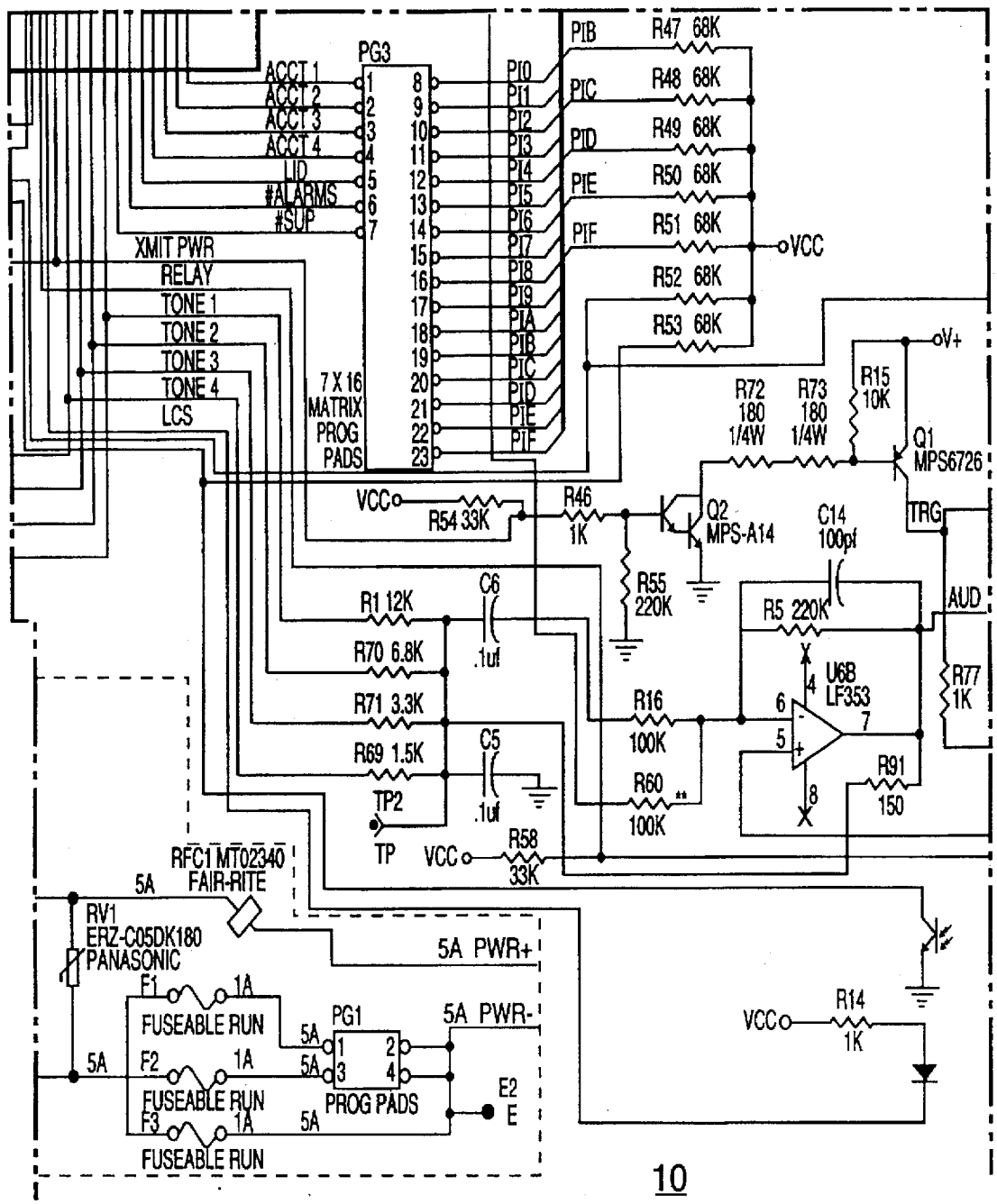
Figure 2F:
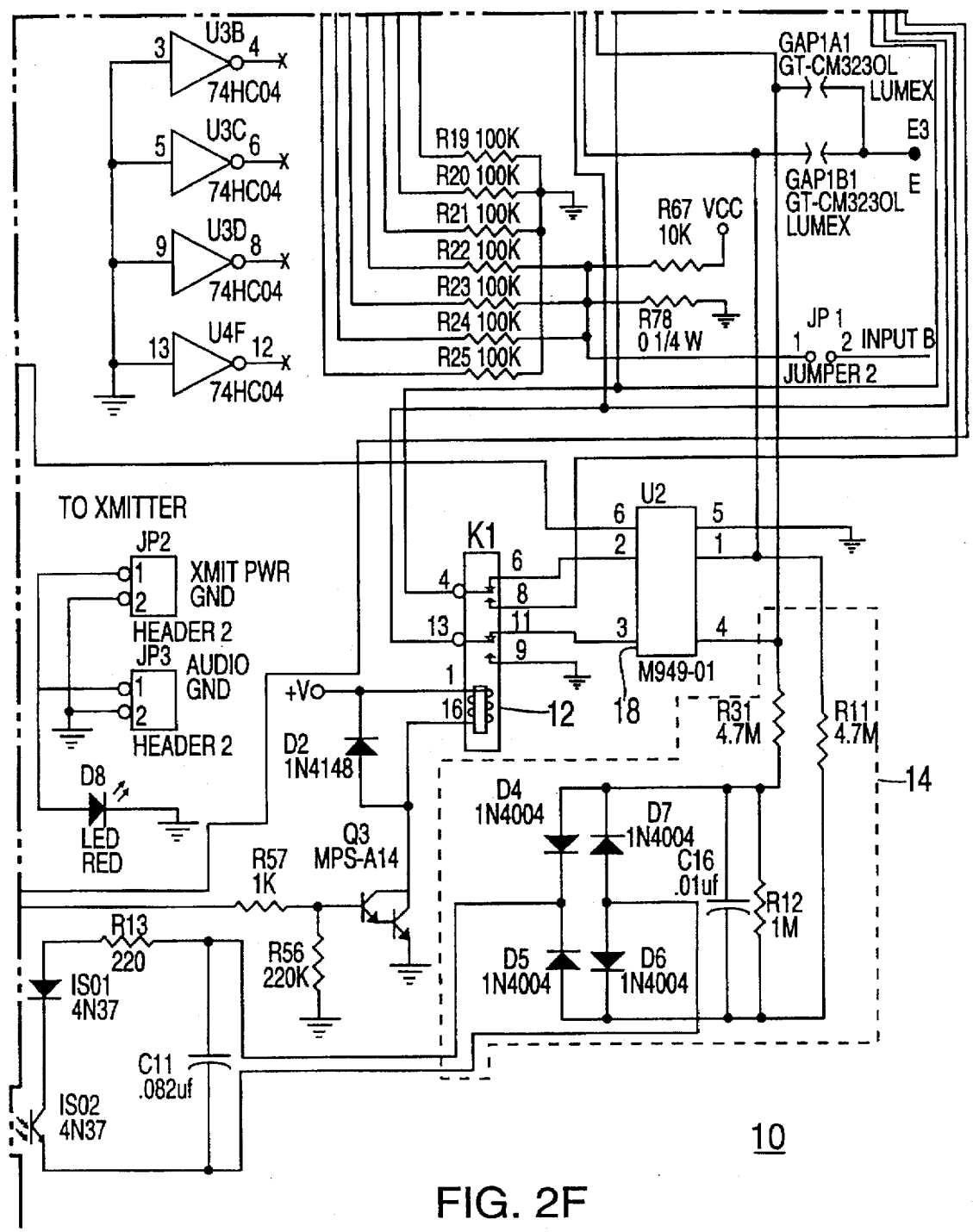

Turning now to FIG. 2, a presently preferred embodiment of an apparatus 10 according to the invention is shown in specific detail with part numbers and suppliers identified as appropriate. The transmitter of the invention is not shown in FIG. 2, but those skilled in the art will appreciate that any AM or FM transmitter may be used. A presently preferred transmitter is a UHF transmitter available from CRN Telemetry Devices, Inc., Centereach, N.Y.

The telephone line interface (12 in FIG. 1) is implemented as a DPDT relay K1 which is coupled to the telephone line [not shown] through pins T12 and T13 of terminal block TB1 and is coupled to an existing dialer [not shown] through pins T11 and T14 of the terminal block TB1. The relay K1 is coupled to pin P31 of the microprocessor U5 via a transistor switch Q3. The microprocessor is preferably a Toshiba TMP 47P 850 V/F which is a 4-bit one-time PROM microcontroller with 8K ROM and 512 nibbles of RAM. This microprocessor is well suited for telephone applications as it includes a built-in DTMF receiver and A/D conversion inputs.

The telephone line fault detector (14 in FIG. 1) is implemented using resistors R11–R14, R31, and R52, capacitors C11 and C16, diodes D4–D7 and relay U2. The relay U2 is available from Teletone Corp., Bothel, Wash. under part number M 994-01. It is a telephone line sensitive relay which provides rotary pulse dial counting and an indication of off-hook telephone line current. The fault detector is coupled to the telephone line via the terminal block through the same pins as the interface and is coupled to pins R91 and P23 of the microprocessor U5 via a pair of opto-isolators ISO1, ISO2.

The DTMF tone detector (16 in FIG. 1) is implemented using the pins VAREF, GS, AIN+ and AIN− of the microprocessor U5. The tone detector is coupled to the dialer [not shown] through the terminal block TB1 via capacitors C8, C9 and resistors R6–R10.

The pulse dial detector (18 in FIG. 1) is implemented using U2 which is coupled to the dialer [not shown] through the terminal block TB1 and is coupled to the pin R92 of the microprocessor U5.

The data pulse and tone detector (20 in FIG. 1) is implemented using capacitors C8, C9 and resistors R6–R10 and operational amplifier U6A which supplies an 1800 Hz signal to pin R81 of the microprocessor U5. The data pulse and tone detector is coupled to the dialer via the DTMF tone detector as described above.

The tone generator (22 in FIG. 1) is implemented using flip-flop U1A which is coupled to the dialer via the terminal block and which receives clock pulses from pin P32 of the microprocessor U5.

The transmitter [not shown in FIG. 2] is coupled to the microprocessor U5 via terminals JP2, JP3. The transmitter is enabled (powered on) via transistor Q1 which is powered by pin P30 on microprocessor U5. Data is sent to the transmitter in the form of audio tones from pins P10–P13 of the microprocessor U5 which tones are summed and filtered by resistors R1, R63–R66, R69–R71 and capacitor C5. An operational amplifier U6B is used to sum a low frequency tone (67–250 Hz) provided by tone generator U7 with the data tones, if required. The low frequency tone is referred to as a CTCSS tone and is required by some receivers to disable the receiver's squelch. The tone generator U7 may be obtained from MX-Com, Inc., Salem, N.C. under part number MX315P and is programmed to generate the CTCSS tone using the program pad PG2.

The power supply (27 in FIG. 1) is implemented using capacitors C1–C3, C12, C18–C22, C27–C29, resistors R44, R45, R93–R97, inductors L1, L2, diodes D1, D10, D11, transistor Q4, voltage regulator U8 (48 volts), voltage regulator VR1 (5 volts), and program pad PG1. The power supply receives 12V DC via pins T1, T2 of the terminal block TB1, fuses F1–F3, RF choke RFC1 and varactor RV1. The RF choke is provided to prevent any RF signals generated by the transmitter from entering the power supply. The power supply provides low voltage Vcc, Vdd to the semiconductors of the apparatus and also provides 48V DC to simulate a telephone line when the dialer is captured. The 48 volt voltage regulator U8 is available from Linear Technology Corp., Miltitas, Calif. under part number LT108CT.

The additional sensor inputs (41–48 in FIG. 1) are provided at pins P40–P43 and P50–P53 of the microprocessor U5 which are coupled to optional sensors [not shown] via the terminal block TB1 through pins T3–T10. As shown in FIG. 2, the inputs are inverted by high speed CMOS digital gates U3 and U4. The input resistors R79–R86 provide a high input impedance to any input signal and the resistors R19–R25 pull the inputs not used to ground.

The microprocessor U5 is programmed in part using the program pad PG3. Pins ACCT1 through ACCT4 from the pad PG3 provide an account number (hexadecimal) for use by the microprocessor to identify the customer and or location of the apparatus 10. The pins PI0 through PIF represent hexadecimal digits 0–F and are tied to the pins ACCT1 through ACCT4 to represent the account number. For example, if pin ACCT1 is tied to pin PI8, the first digit of the account number is 8. Pin LID supplies the microprocessor with a lead in delay, the time delay between powering on the transmitter and transmitting the data burst. The #ALARMS pin provides the microprocessor with the number of times the transmitted message will be repeated. The #SUP pin of the program pad PG3 is used to program a self-test interval wherein the microprocessor activates the transmitter at regular intervals and transmits a "radio check" signal.

Figure 3:
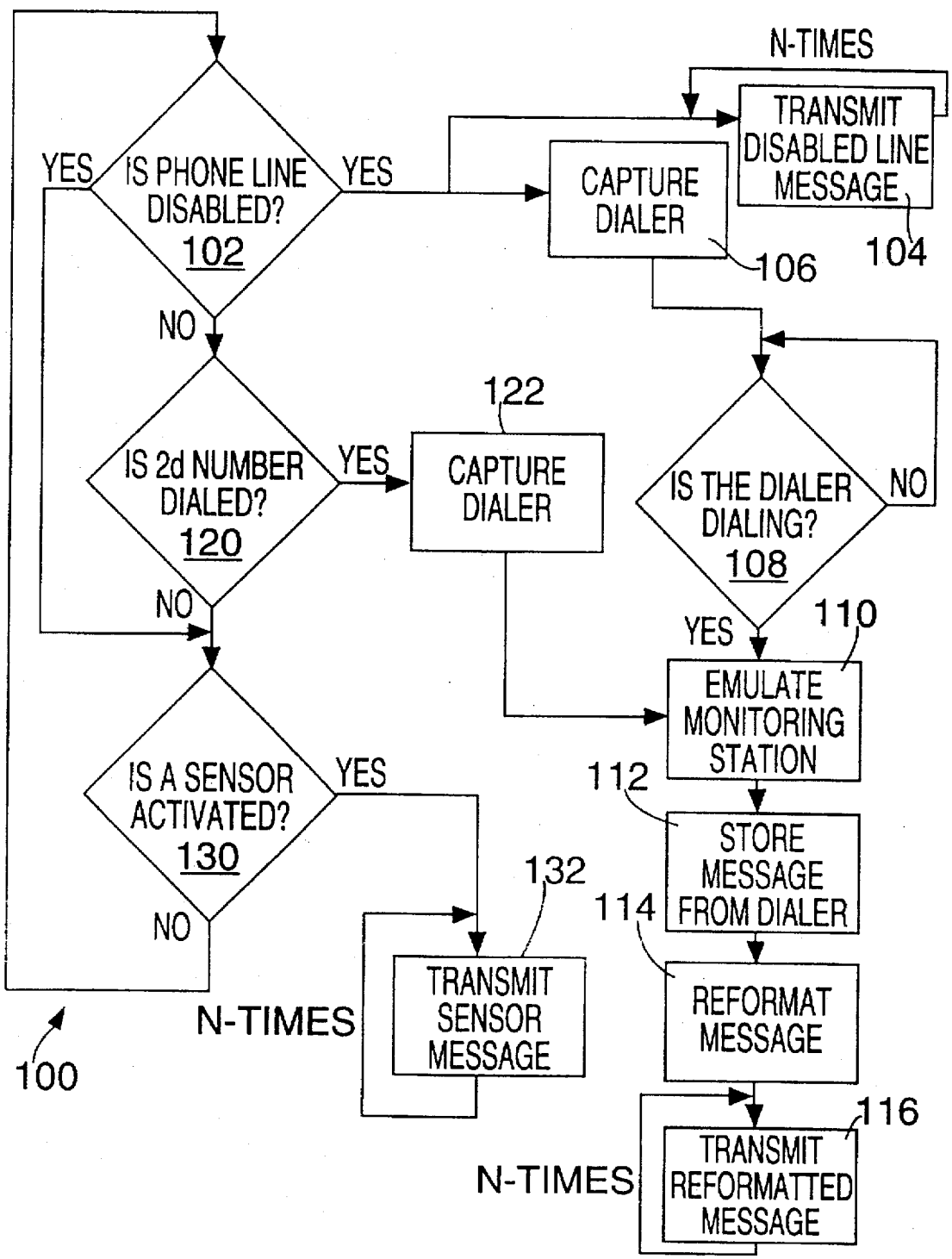
FIG. 3 is a flow chart illustrating operation of the preferred embodiment of the invention.

Turning now to FIG. 3 and with reference to FIGS. 1 and 2, the operation of the apparatus of the invention will be described as follows. The main monitoring loop 100 in FIG. 3 represents three modes of operation of the apparatus. According to the first mode, if the phone line is disabled as determined at 102, the microprocessor U5 receives a signal at pin R91 which results in two actions. First, the transmitter is enabled and a message is sent at 104 indicating that the telephone line is disabled. According to a preferred embodiment of the invention, the message at 104 is repeated several times to assure that it is received and understood by the monitoring station. The number of repetitions is programmed using program pads PG3 to #alarms. In addition, the telephone dialer is captured at 106 by activating the relay K1. This removes the dialer from the telephone line, provides the dialer with the 48V supplied by the power supply to simulate a telephone line connection, and coupled the data pulse tone detector 20 and the tone generator 22 to the dialer. The apparatus then enters a second decision loop at 108 to determine whether the dialer is attempting to dial a number.

This is determined by the DTMF tone detector 16 and or the pulse dial detector 18. If the dialer dials a number, the tone generator 22 provides handshaking at the handshake tone frequency to emulate a telephone connection to the monitoring station at 110. The data pulse tone detector 20 receives the data from the dialer and the data is stored at 112 in the microprocessor U5. The data from the dialer is in the form of DTMF tones or pulses. The data is squared up by the operational amplifier U6A and demodulated by either the DTMF tone detector 16 or the pulse dial detector 18. When the data transmission from the dialer is complete, the microprocessor signals the flip flop U1A to "kiss-off" the dialer. The microprocessor reformats the data (e.g. by including the account number) at 114, activates the transmitter, and transmits the data at 116. According to a preferred embodiment of the invention, the transmission at 116 is repeated several times to assure that it is received and understood by the monitoring station.

According to a second mode of operation included in the main loop 100, the apparatus monitors the dialer at 120 to determine whether the dialer has dialed its second programmed number. This is determined by the DTMF tone detector 16 and or the pulse dial detector 18. If the dialer is dialing the selected number, the dialer is captured at 122 in the same manner as it was captured at 106 and the apparatus communicates with the dialer and transmits its data as described above with reference to 110–116.

According to a third mode of operation included in the main loop 100, the apparatus monitors the additional inputs 41–48 at 130 to determine if an attached sensor is activated. If so, the microprocessor activates the transmitter and transmits an appropriate message at 132 which is preferably repeated several times.

It will be appreciated that if the telephone line is disabled at 102, the third mode of operation at 130 is continued and is not bypassed. However, the second mode of operation at 120 may be bypassed when the phone line is disabled since it is not likely that the dialer will dial the second number. However, it is not necessary to bypass the second mode of operation when the phone line is disabled.

There have been described and illustrated herein several embodiments of a data transmission apparatus for use with a security system having a telephone dialer. While particular embodiments of the invention have been described, it is not intended that the invention be limited thereto, as it is intended that the invention be as broad in scope as the art will allow and that the specification be read likewise. Thus, while particular hardware embodiments have been disclosed, it will be appreciated that other hardware embodiments could be utilized to achieve the same functionality. Therefore, while a relay switch has been shown, it will be recognized that other types of solid state or electromechanical switches could be used with similar results obtained. Moreover, while particular configurations have been disclosed in reference to the pulse and tone detectors and the tone generator, it will be appreciated that other configurations could be used as well. Furthermore, while the invention has been disclosed as controlled by a microprocessor, it will be understood that a programmable logic array or a plurality of hardwired gates can achieve the same or similar function as disclosed herein.

It will therefore be appreciated by those skilled in the art that yet other modifications could be made to the provided invention without deviating from its spirit and scope as so claimed.

We claim:

1. A data transmission apparatus for use with a telephone dialer coupled to a telephone line, comprising:
    a) a telephone dialer communications means for communicating with the telephone dialer and for emulating a bidirectional telephone line connection with the telephone dialer such that when communicating with the telephone dialer, the telephone dialer behaves as if it were communicating bidirectionally via a telephone line connection.
    b) a telephone line interface means coupled to the telephone line and the dialer for selectively uncoupling the dialer from the telephone line and coupling the dialer to said telephone dialer communications means;
    c) a telephone line faults detector means coupled to the telephone line for detecting a fault in the telephone line and coupled to said telephone line interface means;
    d) a radio frequency transmitter coupled to said telephone dialer communications means for transmitting data received from the telephone dialer by said telephone dialer communications means and coupled to said telephone line fault detector means for transmitting a message indicative of a fault in the telephone line, wherein
    when said telephone line fault detector means detects a fault in the telephone line, said radio frequency transmitter transmits said message indicative of a fault in the telephone line and said telephone line interface means uncouples the dialer from the telephone line and couples the dialer to said telephone dialer communications means.

2. An apparatus according to claim 1, wherein:
    said telephone dialer communications means includes a tone detector and a tone generator.

3. An apparatus according to claim 2, wherein:
    said telephone dialer communications means further includes means for generating a 48 volt telephone line emulation.

4. An apparatus according to claim 1, wherein:
    said telephone line interface means includes a DPDT relay switch.

5. An apparatus according to claim 1, wherein:
    said telephone line fault detector means includes means for detecting one of on-hook voltage and off-hook current.

6. An apparatus according to claim 5, wherein:
    said telephone line fault detector means includes means for determining whether a fault in the telephone line has existed for at least sixty seconds.

7. An apparatus according to claim 1, further comprising:
    e) a plurality of sensor inputs coupled to said radio frequency transmitter, wherein
    said radio frequency transmitter transmits a message in response to a signal from one of said sensor inputs.

8. An apparatus according to claim 1, further comprising:
    e) means for causing said radio frequency transmitter to repeatedly transmit data received from the telephone dialer.

9. An apparatus according to claim 1, further comprising:
    e) means for causing said radio frequency transmitter to repeatedly transmit said message indicative of a fault in the telephone line.

10. A data transmission apparatus for use with a telephone dialer coupled to a telephone line, comprising:
    a) a telephone dialer communication means for communicating with the telephone dialer and for emulating a bidirectional telephone line connection with the telephone dialer such that when communicating with the telephone dialer, the telephone dialer behaves as if it were communicating bidirectionally via a telephone line connection;

b) a telephone line interface means coupled to the telephone line and the dialer for selectively uncoupling the dialer from the telephone line and coupling the dialer to said telephone dialer communications means;

c) a telephone number detector means coupled to the telephone dialer for detecting a selected telephone number dialed by the dialer and coupled to said telephone line interface means;

d) a radio frequency transmitter coupled to said telephone dialer communication means for transmitting data received from the telephone dialer by said telephone dialer communications means, wherein when said telephone number detectors means detects the dialer dialing said selected telephone number, said telephone line interface means uncouples the dialer from the telephone line and couples the dialer to said telephone dialer communications means, and data from the dialer is transmitted by said radio frequency transmitter.

11. An apparatus according to claim 10, wherein:

said telephone dialer communications means includes a tone detector and a tone generator.

12. An apparatus according to claim 11, wherein:

said telephone dialer communications means further includes means for generating a 48 volt telephone line emulation.

13. An apparatus according to claim 10, wherein:

said telephone line interface means includes a DPDT relay switch.

14. An apparatus according to claim 10, wherein:

said telephone number detector means includes one of a pulse dial detector and a DTMF tone detector.

15. An apparatus according to claim 10, further comprising:

e) a plurality of sensor inputs coupled to said radio frequency transmitter, wherein said radio frequency transmitter transmits a message in response to a signal from one of said sensor inputs.

16. An apparatus according to claim 10, further comprising:

e) means for causing said radio frequency transmitter to repeatedly transmit data received from the telephone dialer.

* * * * *